Jan. 27, 1959   J. G. WOOD ET AL   2,870,886
SLIP COUPLING FOR BELT FASTENING MACHINES
Filed Nov. 12, 1953   2 Sheets-Sheet 1

Inventors:
JOHN GLEGHORN WOOD
SIDNEY BEETHAM HAINSWORTH
BERNARD TEBB
By
Bailey, Stephen & Huettig
Attorneys

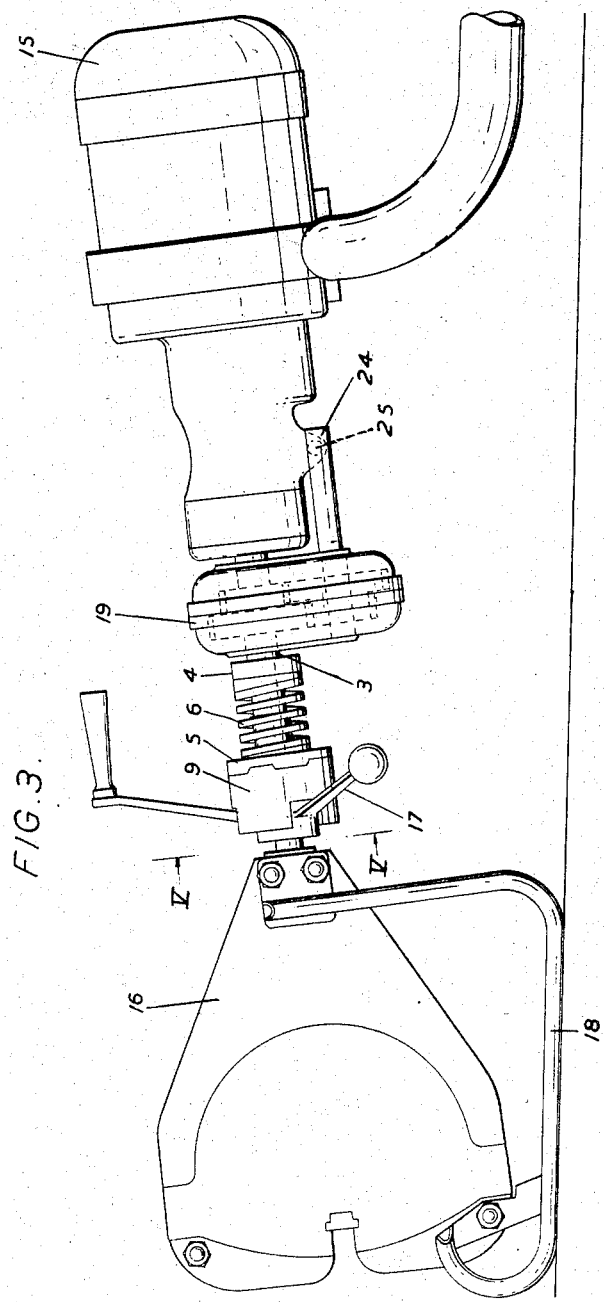

United States Patent Office 2,870,886
Patented Jan. 27, 1959

2,870,886

SLIP COUPLING FOR BELT FASTENING MACHINES

John Gleghorn Wood, Sutton, near Hull, Sidney Beetham Hainsworth, Elloughton, Brough, and Bernard Tebb, Hull, England, assignors to Mastabar Mining Equipment Company Limited, a British company Application November 12, 1953, Serial No. 391,701

Claims priority, application Great Britain November 17, 1952

3 Claims. (Cl. 192—3.5)

The invention relates to belt fastening equipment for use with heavy duty power transmission and conveyor belts such as are used underground in coal mining. Such belts are normally fastened by wire hooks which are inserted by hand operated machinery, such as the machines described in British patent specifications Nos. 508,198 and 624,960. Though such machinery has been in use for a number of years, and it would be attractive to provide a power drive therefor, the added difficulty and complication necessitated by the adequate flame proofing of any underground mechanical or electrical equipment and the cumbersome nature of such equipment for transport underground has prevented the adoption of power-driven machinery for belt fastening in coal mines.

In accordance with the invention an adaptor is provided for supplying power to a belt fastening machine, the adaptor comprising a driven member adapted to engage the socket of a coal drill holder, and a driving member adapted to engage the handles of the belt fastening machine and a connecting member for transmitting power between said driving and driven members.

Conveniently the adaptor has a dogged slip coupling interposed between the driving and driven members, the coupling being adapted to slip when the stress in the connecting member reaches a safe maximum. The coupling may conveniently be a dog clutch so that the drive between the driving and driven members whilst the coupling is slipping takes the form of a series of impacts which assist the penetration of the belt by the wire fasteners but which obviates the danger of a wrong adjustment of the driving speed or of an obstruction in the fastening machine causing the power transmitted between the coal drill and the fastening machine to reach such a value either that the fastening machine rotates as a whole or that the operator cannot hold the body of the coal drill holder against rotation.

The connecting member may also conveniently include a gear box having an abutment engaging a projection on the coal drill so that the gear box is prevented from rotating whilst the adaptor is in use.

Figure 1:
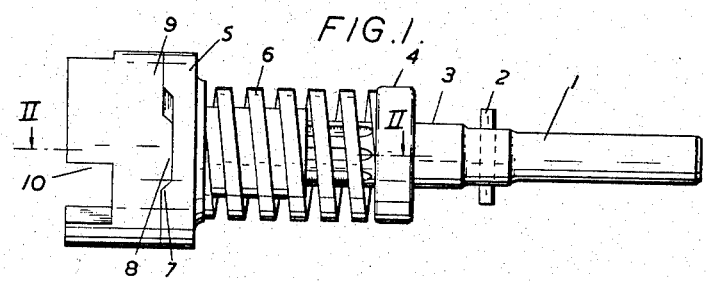
Figure 2:
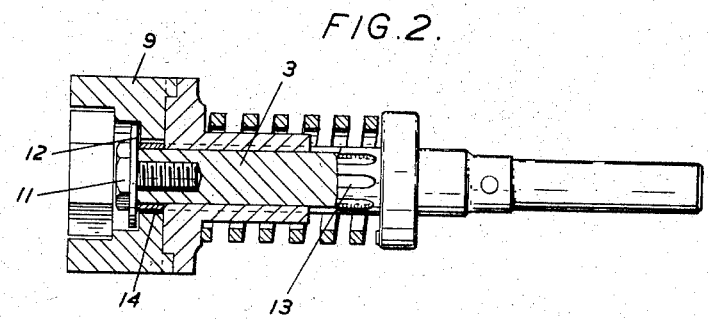
Figures 4, 5:
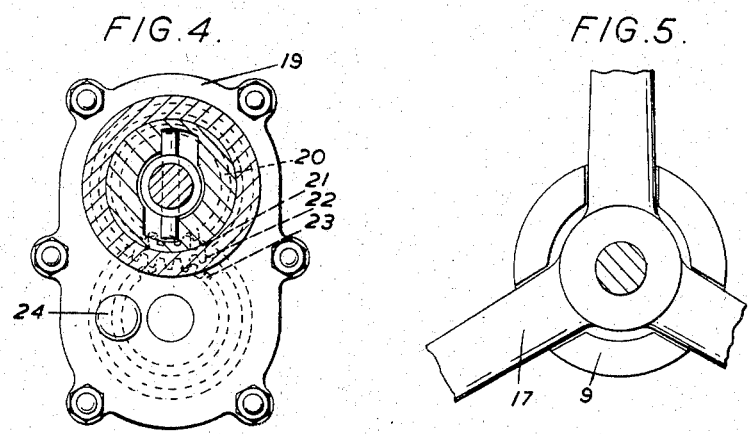

The invention is illustrated in the accompanying drawings in which Figure 1 is a side elevation of one form of adaptor and Figure 2 is a view partly in section along the lines II—II of Figure 1. Figures 3 to 5 illustrate an assembly employing a modified form of adaptor embodying a gear box, Figure 3 being a side elevation, Figure 4 being an end elevation partly in section of the gear box and Figure 5 a view along the lines V—V of Figure 3.

Referring to Figures 1 and 2, the adaptor comprises a driving butt 1 fitted with a cross pin 2 which engages the socket of a coal drill holder, the butt 1 being integral with a connecting shaft 3 which is splined towards the other end at 13 for engagement with an internally splined sleeve 5 which carries driving dogs 7 which engage with corresponding driving dogs 8 on the driven member 9, which is slotted at 10 to engage the star handles of the coal drilling machine. The driving dogs 7 and 8 are normally held in engagement by a coil spring 6 one end of which engages the sleeve 5 whilst the other end engages a collar 4 on the shaft 3. To prevent the driven member 9 being lost it is held by a screw 11 which enters a tapped hole in the shaft 3, the screw engaging a washer 12 abutting a spacer 14 so that the driven member 9 is prevented from moving axially in relation to the shaft 3, but is free to rotate thereon under load.

In operation the drive is transmitted from the shaft 3 through the splines to the sleeve 5 and thence through the dogs 7 and 8 to the driven member 9 which consequently rotates carrying with it the arms of the belt fastening machine. If, however, the shaft 3 is rotated too fast or the belt fastening machine becomes jammed so that the torsion in the shaft 3 exceeds a maximum predetermined by the strength of the spring 6, the sleeve 5 slides on the shaft 3 and the dogs 7 slip over the dogs 8, a series of impacts thus being transmitted to the driven member 9.

The method of using an adaptor in accordance with the invention is illustrated in Figures 3 to 5, the adaptor there shown being one in which the connecting shaft 3 is divided, a gear box being interposed between the two halves of the shaft 3.

Referring to Figure 3 the coal drill holder is shown at 15 and comprises a body having an electrically or pneumatically driven motor. The belt fastening machine comprises a body 16 mounted on a stand 18. The belt fastening machine which is described in more detail in the specifications above referred to is of a kind in widespread use and is consequently not shown in detail. The belt fastening machine has a three-limbed star handle 17 which engages with the slots 10 in the driven member 9 of the adaptor. The gear box 19 comprises a train of four gears 20, 21, 22, 23, thus providing the desired speed for the driven and driving members of the adaptor and carries a projecting abutment rod 24 which engages a projection 25 on the body of the coal drill holder 15 so as to prevent the gear box from rotating by torque reaction.

In operation if with either form of adaptor the loading on the shaft 3 exceeds the predetermined maximum the drive is disconnected by slipping of the dogs 7 and consequently danger to the operator is eliminated. Without a slipping coupling between the driving and driven members the operator might be unable to hold the body of the coal drill holder against rotation or, alternatively, the belt fastening machine might undergo bodily rotation, and causes material damage or injury to the operator. A dogged slip coupling is preferred, since it ensures that whilst the coupling is slipping the driven member 9 receives a series of impacts, which assist the penetration by wire fasteners of a belt being operated upon by the fastening machine 16.

We claim:

1. A power drive for a belt fastening machine adapted to be used in coal mines comprising a coal mine drill motor, a conveyor belt fastening machine, and an overload dogged slip coupling connecting said motor and fastening machine for driving said fastening machine from said motor and for imparting a series of driving impacts to said fastening machine by the slipping of said dogged coupling upon overload of said coupling.

2. A power drive as in claim 1, further comprising gear reduction means between said motor and said dogged slip coupling.

3. A power drive as in claim 2, further comprising an abutment rod on said gear reduction means engaging said motor for preventing the relative displacement thereof.

References Cited in the file of this patent

UNITED STATES PATENTS

| | | |
|---|---|---|
| 2,102,002 | Hill | Dec. 14, 1937 |
| 2,291,407 | Paul | July 28, 1942 |
| 2,313,708 | Waller | Mar. 9, 1943 |
| 2,333,553 | Potgieter | Nov. 2, 1943 |
| 2,489,536 | Nelson | Nov. 29, 1949 |

FOREIGN PATENTS

| | | |
|---|---|---|
| 323,576 | Italy | Dec. 28, 1934 |